United States Patent [19]

Ebihara et al.

[11] 4,157,588

[45] Jun. 5, 1979

[54] MINIATURE TYPE ELECTRONIC DEVICE

[75] Inventors: Heihachiro Ebihara; Fukuo Sekiya, both of Tokorozawa; Takashi Yamada, Sayama, all of Japan

[73] Assignee: Citizen Watch Co. Ltd., Tokyo, Japan

[21] Appl. No.: 826,985

[22] Filed: Aug. 23, 1977

[30] Foreign Application Priority Data

Sep. 2, 1976 [JP] Japan .................................. 51-105254

[51] Int. Cl.² .......................... G06F 7/38; G06F 1/04
[52] U.S. Cl. ..................................... 364/707; 364/705
[58] Field of Search ............... 364/705, 707; 58/50 R, 58/152 R

[56] References Cited

U.S. PATENT DOCUMENTS

| 3,813,533 | 5/1974 | Cone et al. ............................ 364/705 |
| 3,922,526 | 11/1975 | Cochran ................................ 364/707 |
| 3,928,960 | 12/1975 | Reese ................................. 364/705 X |
| 3,941,989 | 3/1976 | McLaughlin et al. ................ 364/707 |
| 3,955,355 | 5/1976 | Luce ..................................... 58/50 R |

*Primary Examiner*—Jerry Smith
*Attorney, Agent, or Firm*—Sherman & Shalloway

[57] ABSTRACT

A miniature type electronic device having a calculating ability is disclosed. The device comprises an exterior operating member for changing over a calculation enable mode to a calculation disable mode and vice versa and a memory circuit for continuously memorizing a final calculation result when the calculation disable mode is set by the operating member, whereby subsequent calculations can be continued on the basis of the final calculation result when the calculation enable mode is set again by the operating member.

9 Claims, 11 Drawing Figures

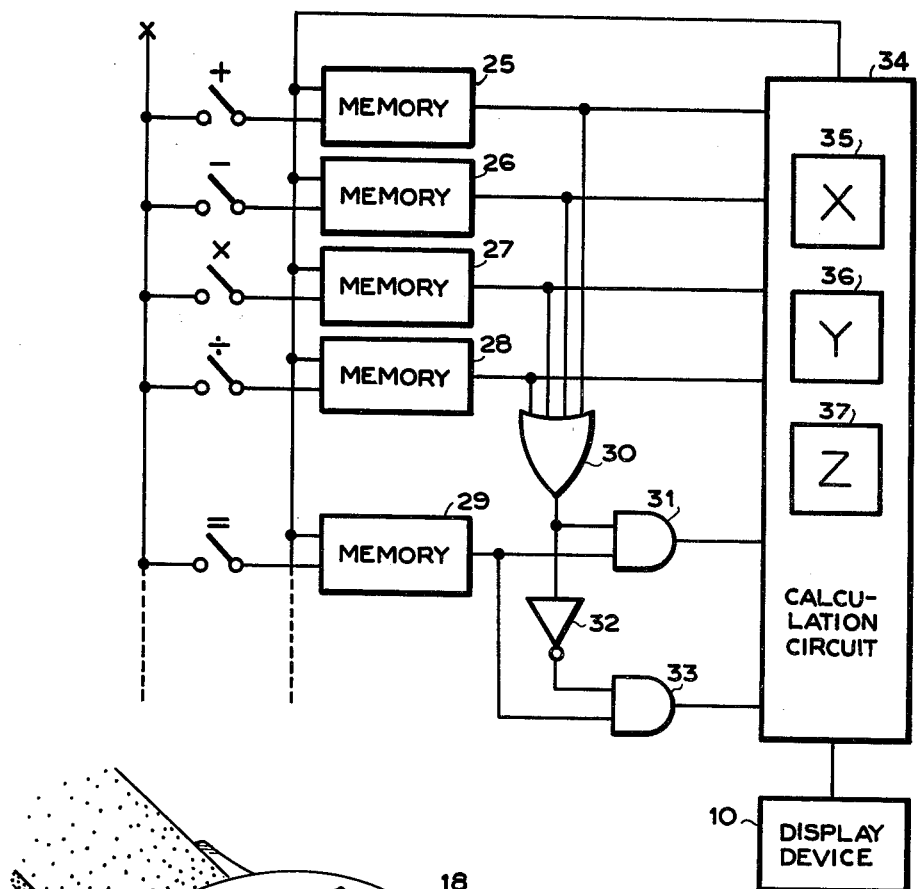
FIG. 10
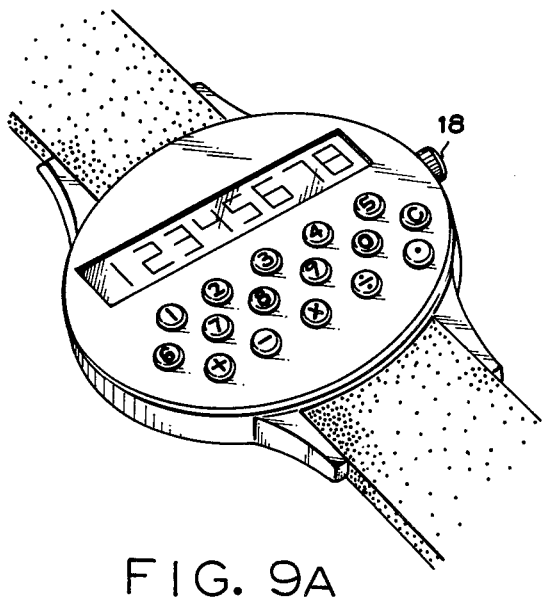
FIG. 9A
FIG. 9B

MINIATURE TYPE ELECTRONIC DEVICE

BACKGROUND OF THE INVENTION

1. Field of the Invention

This invention relates to a miniature electronic device having a calculating ability.

2. Description of the Prior Art

A conventional miniature type electronic device having a calculating ability makes use of an electric source switch which is selectively turned ON and OFF so as to change over a calculation enable mode to a calculation disable mode and vice versa. In the calculation disable mode, an electric source is disconnected from a calculation circuit, so that the contents of the registers constituting the calculation circuit are lost. As a result, when the electric source switch is turned ON so as to obtain the calculation enable mode, entirely meaningless numbers are displayed or a calculation circuit is automatically cleared thus is displayed zero.

Such conventional device is very inconvenient when calculation keys are operated at intervals of time which are separated from each other. For example, in the case of leaving sums of money paid during daytime as they are and calculating the final result thereof at night, the electric source switch is required to be the ON position for a long time in order to keep the calculation result until a next input arrives at the calculation circuit, thereby consuming a large amount of electric power. In addition, careful attention must be paid not to change the calculation result by touching the calculation key by mistake between calculation periods.

SUMMARY OF THE INVENTION

An object of the invention, therefore, is to provide a useful miniature type electronic device which can eliminate the above mentioned drawbacks which have been encountered with the prior art techniques.

Another object of the invention is to provide a miniature electronic device which not only has a calculating ability but also has other useful abilities such as can display information under the calculation disable mode.

A further object of the invention is to provide a miniature type electronic device which is provided with an exterior operating member for changing over a calculation enable mode to a calculation disable mode and vice versa.

A feature of the invention is the provision of a miniature type electronic device having a continuous calculating ability, comprising an exterior operating member for changing over a calculation enable mode to a calculation disable mode and vice versa and a memory circuit for continuously memorizing a final calculation result when the calculation disable mode is set by the operating member, whereby subsequent calculations can be continued on the basis of the final calculation result when the calculation enable mode is set again by the operating member.

BRIEF DESCRIPTION OF THE DRAWINGS

FIG. 9A is a front elevational view of a wrist watch which is another embodiment of a miniature electronic device according to the invention;

FIG. 9B is a front elevational view of the display device of the wrist watch shown in FIG. 9A, showing successive steps of changing over the calculation enable mode to the time keeping mode and vice versa; and FIG. 10 is a block diagram of means for discriminating an operating time of an equal (=) key from those of calculation keys.

PREFERRED EMBODIMENTS OF THE INVENTION

The invention will now be described in greater detail with reference to the accompanying drawings.

Figure 1:
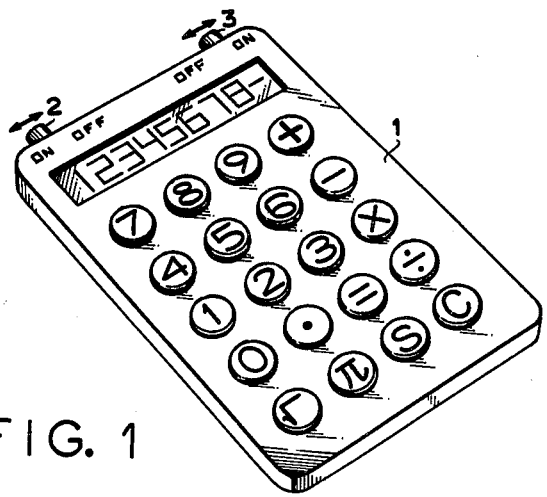
FIG. 1 is a front elevational view of one embodiment of a miniature type electronic device according to the invention.

In FIG. 1 shows one embodiment of a miniature type electronic device according to the invention. In the present embodiment, a miniature type electronic device 1 is provided at its top surface with an electric source switch 2 and a mode change-over switch 3. When both the switches 2, 3, are turned ON, respectively, as shown in FIG. 1, the device is under its calculation enable mode. If the electric source switch 2 remains ON, but the mode change-over switch 3 is turned OFF, the device becomes changed into a lock mode in which the display disappears thus rendering it impossible to supply an input through the calculation keys. In this case, a final calculation result is memorized and remains as it is in a calculation circuit to be described later.

If the mode change-over switch 3 is made ON again, the device is changed into its calculation enable mode in which case the final calcuation result is displayed again thus permitting subsequent calculations to continue.

In the lock mode, it is sufficient to operate only that part of the device which is required for maintaining the memorized final calculation result. The operation of any other parts such as the display part, etc., is not provided. In addition, in a device which requires a clock pulse in a steady state and comprises circuits which consume electric power in dependence with a frequency, it is possible to lower the frequency of the clock pulse, change over the electric source voltage to a low voltage or insert a resistor between the circuit and the electric source for the purpose of making the consumed electric power as small as possible.

Figure 2:
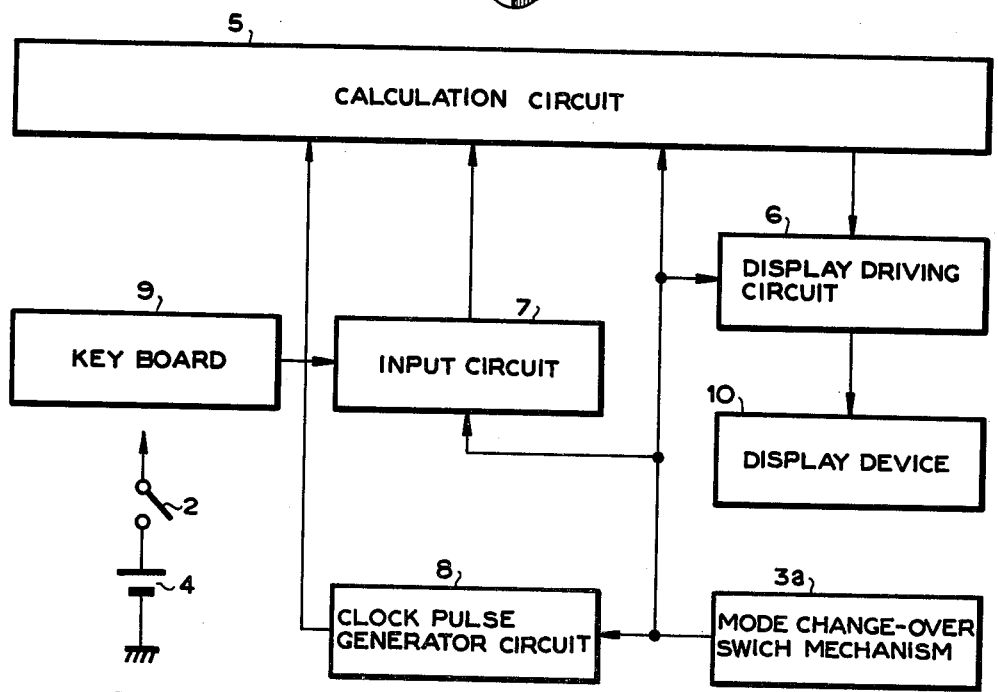
FIG. 2 is a block diagram of main parts of the device shown in FIG. 1.

In FIG. 2 is shown a block diagram of the device shown in FIG. 1. In the construction shown in FIG. 2, an electric source 4 is connected through an electric source switch 2a to main parts of the device. A mode change-over switch mechanism 3a is connected to a calculation circuit 5, a display driving circuit 6, an input circuit 7 and a clock pulse generator circuit 8, respectively. To the input circuit 7 is connected a key board 9 and to the display driving circuit 6 is connected a display device 10.

As described above, if the mode change-over switch 3a is operated to change over the device to its lock mode, the input circuit 7 functions to prohibit an input from the key board 9, the display driving circuit 6 functions to generate a signal for eliminating the display, the calculation circuit 5 functions to continuously memorize the final calculation result, and the clock pulse generator circuit 8 functions to stop unnecessary clock pulses or make the frequency of necessary clock pulses as small as possible.

Figure 3:
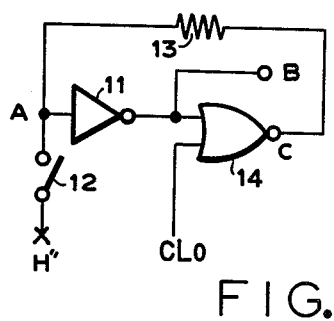
FIG. 3 is a circuit diagram of one embodiment of the mode change-over switch mechanism shown in FIG.2.

In FIGS. 3 to 7 are shown in detail the circuits shown in FIG. 2, respectively. In FIG. 3 is shown one embodiment of the mode change-over switch mechanism 3a shown in FIG. 2. In the present embodiment, an input end A of an inverter 11 is connected through a switch 12 to a high potential side of an electric source on the one hand and connected through a resistor 13 to an output end C of a two inputs NOR gate 14 on the other hand. One of two input ends of the NOR gate 14 is connected to an output end B of the inverter 11 and to the other input end thereof is applied a clock pulse $CL_o$. When the switch 12 is open and the clock pulse $CL_o$ has a high potential level (hereinafter abbreviated as "H"), the output end C of the NOR gate 14 a low potential level (hereinafter will be called as "L"). In this case, the input end A of the inverter 11 also becomes "L," so that its output end B becomes "H." If the output end B becomes "H," the output end C of the NOR gate 14 maintains "L" even when the clock pulse $CL_o$ becomes "L." As a result, the output end B maintains "H." This condition is continued until the switch 12 is closed. If the switch 12 is closed, the input end A of the inverter 11 is forcedly brought into "H" even when the output end C of the gate 14 is "L," so that the output end B of the inverter 11 becomes "L." That is, the output end B of the inverter 11 becomes "L" when the switch 12 is closed and becomes "H" when the switch 12 is open. Thus, the mode change-over switch mechanism shown in FIG. 3 can eliminate the chattering produced from the mechanical switch 12. The resistor 13 may be incorporated into the NOR gate 14. If the mechanism shown in FIG. 3 is composed of complementary MOS transistors, a channel resistor of a MOS transistor constituting the NOR gate 14 may be altered so as to omit the resistor 13.

Figure 4:
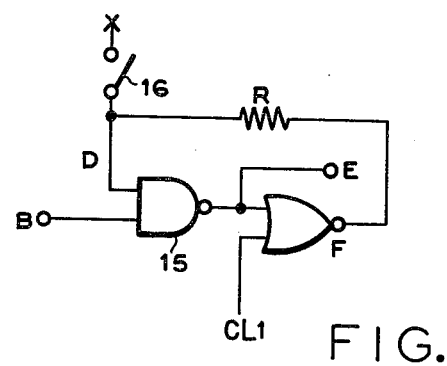
FIG. 4 is a circuit diagram of one embodiment of the input circuit shown in FIG. 2.

In FIG. 4 is shown one embodiment of the input circuit 7 shown in FIG. 2 and exhibiting the input from the key board 9. In the present embodiment, use is made of a NAND gate 15 in place of the inverter 11 shown in FIG. 3. If an input end B of the NAND gate 15 is "H," the input circuit shown in FIG. 4 will operate in the same manner as the mode change-over switch mechanism shown in FIG. 3. If the input end B of the NAND gate 15 is "L," an output end E of the NAND gate 15 is maintained at "H" irrespective of a condition of a switch 16. As a result, the input circuit shown in FIG. 4 functions to prohibit the input from the key board 9 shown in FIG. 2.

Figure 5:
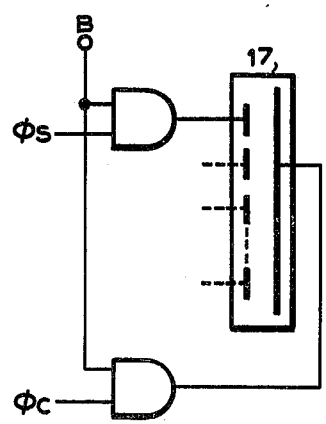
FIG. 5 is a circuit diagram of one embodiment of the display driving circuit and the display device shown in FIG. 2.

In FIG. 5 is shown one embodiment of the display driving circuit 6 shown in FIG. 2 and generating a signal for eliminating the display. A display body 17 is formed of a liquid crystal display body.

If an input end B is "H," a segment driving signal $\phi_s$ is applied to a segment electrode and a common electrode driving signal is applied to a common electrode. If the input end B becomes "L," "L" is applied to both the common electrode and the segment electrode to eliminate the display.

Figure 6:
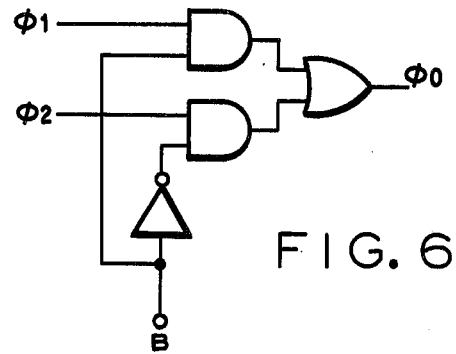
FIG. 6 is a circuit diagram of one embodiment of a circuit for changing the frequency of the clock pulse delivered from the clock pulse generator circuit shown in FIG. 2.

In FIG. 6 is shown one embodiment of a circuit for controlling the clock pulse generator circuit 8 shown in FIG. 2 so as to change the frequency of the clock pulse supplied to the calculation circuit 5 shown in FIG. 2. If an input end B is "H," $\phi_1$ is delivered to an output end. If the input end B is "L," $\phi_2$ is delivered to the output end.

Figure 7:
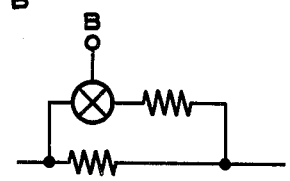
FIG. 7 is a circuit diagram of a modified embodiment of the circuit shown in FIG. 6.

In FIG. 7 is shown a modified embodiment of the circuit for controlling the frequency of the clock pulse shown in FIG. 6. In the present embodiment, in a clock pulse oscillator composed of a resistor and a condenser, use is made of a semiconductor switch for the purpose of changing over a value of the resistor or condenser and changing the frequency of the clock pulse.

Figure 8:
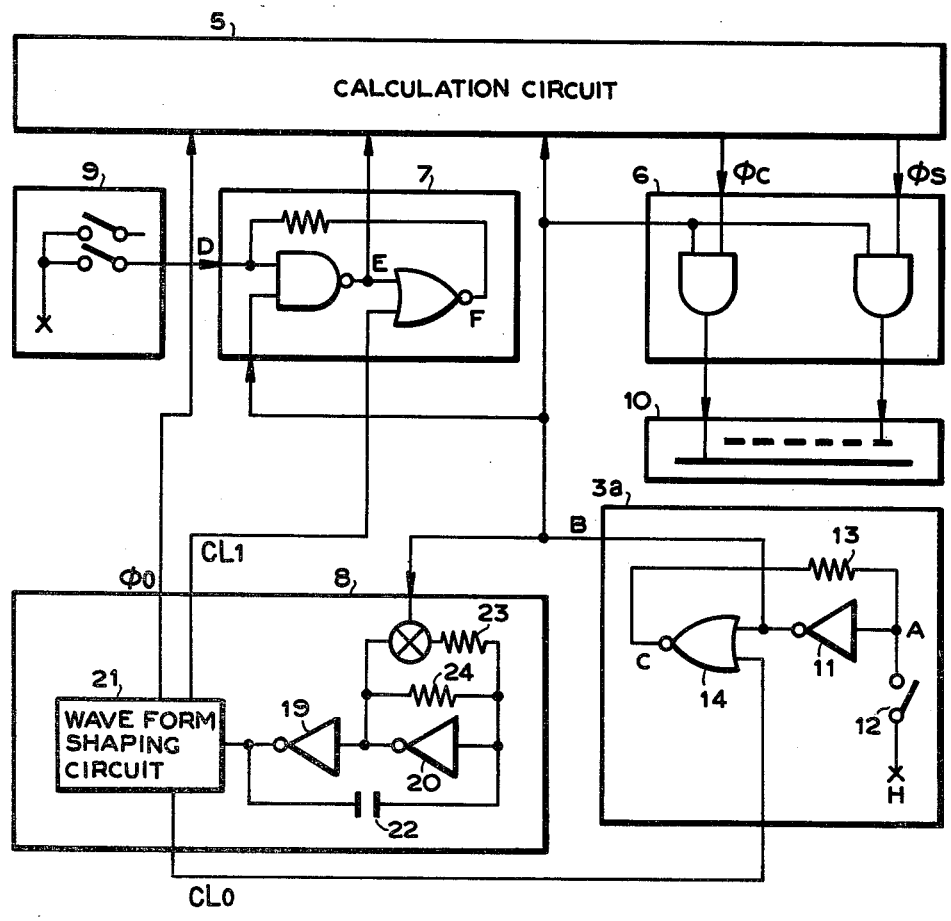
FIG. 8 is a circuit diagram of a concrete embodiment of the device shown by the block diagram in FIG. 2.

In FIG. 8 is shown an embodiment of the device shown by the block diagram in FIG. 2, a part of the practical construction being shown for convenience of explanation.

If the switch 12 of the mode change-over switch mechanism 3a is operated, the input circuit 7 functions to prohibit the input signal from the key board 9, the display driving circuit 6 functions to prohibit the operation of the display device 10 and the clock pulse generator circuit 8 functions to lower the frequency of the clock pulse. As a result, it is possible to decrease the overall consumed current.

In the clock pulse generator circuit 8, inverters 19, 20, a condenser 22 and resistors 23, 24 constitute a multivibrator which functions to cooperate with a wave form shaping circuit 21 so as to generate various kinds of clock pulses.

As stated hereinbefore, the device according to the invention is capable of reliably maintaining the final calculation result with the least electric power. In the above described embodiment, use is made of a so-called dynamic type register. In this case, if the generation of the clock pulse is stopped, the memorized contents become lost, and as a result, it is impossible to completely stop the generation of the clock pulse. But, if use is made of a statistic type register, the generation of the clock pulse may be stopped. In addition, a part of the circuit other than the register may be disconnected from the electric source.

In FIG. 9A is shown a wrist watch which is another embodiment of the device according to the invention and not only having the calculating ability but also having a time keeping ability. In FIG. 9B are shown successive steps of changing over the display from the calculation enable mode displaying the calculation result to the time keeping mode displaying the time and then to the calculation enable mode displaying the calculation result. In the present embodiment, a mode change-over switch 18 may be operated so as to alternately display the time and the calculation result. In the time keeping mode, the memorized final calculation result is kept as it is and the input from the key board is prohibited. The input from the key board may also be used as means for seting time.

It is a matter of course that, in the case of a device having any other ability than the time keeping ability, the input from the key board may be used as means for setting such ability.

The embodiment shown in FIG. 9A is not provided with the electric source switch. In the present embodiment, if the calculation circuit is composed of an element which consumes less electric power such as complementary MOS transistors, an electric current injection type logic circuit Ill, etc. and if memories are composed of statistic type shift registers, RAM, etc., even a device such as a timepiece which can operate with the aid of a small capacity battery may be used for one to several years without cutting off its electric source.

The wrist watch shown in FIG. 9A is not provided with an equal (=) key, but the exterior operating member 18 functions also as the equal (=) key. The exterior operating member 18 may change over its normal position to one step pushed in position in the same manner as a push button and to one step pulled out position. That is, the exterior operating member 18 functions as the equal (=) key when it is pushed in and functions as the mode change-over switch when it is pulled out. It is a matter of course that the exterior operating member 18 may also be used as the clear key, for example, instead of using as the equal (=) key. In addition, if the device is changed over to the calculation disable mode without effecting calculation after numbers have been set, these numbers are continuously memorized until the next calculation enable mode is set. As a result, if telephone numbers, etc., for example, are set, the device may be used as a memory note. In this case, it is preferable to display the contents of a plurality of registers in succession with the aid of the exterior operating member.

In the embodiment shown in FIG. 9A, the equal (=) key pushed in before the calculation keys such as (+) (−) (×) (÷), etc., are set functions to change over the register to be displayed. In this case, only during pushing in operation of the equal (=) key, a register content which is different from the usually displayed register may be displayed. In addition, the registers to be alternately displayed every time the equal (=) key is pushed may be changed over. Once the calculation key is pushed, the equal (=) key is returned to its usual operation mode.

In FIG. 10 is shown means for discriminating the operating time of the equal (=) key from that of the calculation key. As shown in FIG. 10, (+), (−), (×), (÷) calculation keys are connected to respective memory circuits 25,26,27,28, 29, respectively. In practice, provision is also made of a circuit for preventing chattering. Such circuit, however, is irrelevant to the subject matter of the invention and hence is not shown in FIG. 10. Each output from the memory circuits 25 to 28 is connected to a calculation circuit 34 including registers 35,36,37 and to different input ends of an OR gate 30. An output end of the OR gate 30 is connected to one of input terminals of an AND gate 31 and connected through an inverter 32 to one of input terminals of an AND gate 33. An output from the memory circuit 29 connected to the (=) key is connected in common to the other input terminals of the AND gates 31,33 whose outputs are connected to the calculation circuit 34. The calculation circuit 34 functions to deliver a signal to a display device 10 and functions to deliver a reset signal to the memory circuits 25 to 29. The memory circuits 25 to 29 are set at instants only when the switches of the calculation keys are closed. In the initial condition, all of the memory circuits 25 to 29 are reset. As a result, the output from the OR gate 30 is "L" and the output from the inverter 32 becomes "H." In the (=) key is pushed to make the output from the memory circuit 29 "H," the output from the AND gate 33 becomes "H" and this output signal functions to change over the registers. The calculation circuit 34 functions to deliver a suitable reset signal to the memory circuits 25 to 29. At this instant, if the switches are OFF, the memory circuits are reset. If either one of the calculation keys has been pushed before the (=) key is pushed, the output from the OR gate 30 is "H." At this instant, if the (=) key is pushed, an "H" signal is obtained from the AND gate 31. This "H" signal is recognized as the usual (=) key operation in the calculation circuit 34.

The registers to be displayed may be changed over by the most elementary technique well known in the miniature type portable calculating machine, etc. in general, so that such change-over operation per se is not described. A miniature type electronic device having a calculating ability is usually provided with three registers. As a result, the (=) key may be operated to alternately display the contents of two registers or to display the contents of these three registers in succession.

As stated hereinbefore, the device according to the invention is capable of memorizing the final calculation result under the calculation disable mode with the least possible consumption of electric power. Thus, the device according to the invention is very convenient in the case of effecting calculation with a long interval of time of setting numbers. Particularly, even when the calculation is not effected, numbers to be memorized such as telephone numbers may be set and if the device may be changed over to the calculation disable mode, the above mentioned numbers may be read out by setting the device to the calculation enable mode again. Thus, it is significantly convenient to use the device according to the invention as a memory note. In this case, it is particularly convenient to construct the device according to the invention such that a plurality of memories can be changed over and displayed by the exterior operating member.

What is claimed is:

1. A miniature type electronic device having a calculation ability, comprising
   (a) a mode change-over switch mechanism having an input and an output for changing over a calculation enable mode to a calculation disable mode and vice versa;
   (b) a calculation circuit having a first input connected to said mode change-over switch mechanism and having second and third inputs, an output and including a plurality of volatile memory devices;
   (c) an input circuit having a first input, a second input connected to the output of the mode change-over switch mechanism, a third input and an output connected to the second input of said calculation circuit;
   (d) a key board having an output connected to the first input of said input circuit;
   (e) a display driving circuit having a first input connected to the output of said calculation circuit and a second input connected to the output of the mode change-over switch mechanism and an output;
   (f) a display device connected to the output of said display driving circuit; and
   (g) a clock pulse generator circuit including a wave form shaping circuit having an input connected to the output of the mode change-over switch mechanism, a first output connected to the input of the mode change-over switch mechanism, a second output connected to the third input of the calculation circuit, and a third output connected to the third input of said input circuit, whereby when said mode change-over switch mechanism changes the calculation enable mode to the calculation disable mode, the power of a power supply is continuously applied to at least one of said volatile memory devices, the input circuit input from from said key board output is inhibited, and said display driving circuit input from said memory devices is inhibited so that the content of said memory device is not lost.

2. A device according to claim 1, wherein an equal key on said keyboard is operated at intervals of time from a time at which a clear key on said keyboard is pushed to a time at which a first calculation key is pushed and functions to change over contents of registers to be displayed.

3. The miniature type electronic device as claimed in claim 1 wherein said mode change-over switch mechanism includes an inverter having an output and a NOR gate having first and second inputs, the output of the inverter connected to the first input of the NOR gate and the second input of the NOR gate connected to the clock pulse generator circuit.

4. The miniature type electronic device as claimed in claim 1 wherein said input circuit includes a NAND gate having first and second inputs and an output and a NOR gate having first and second inputs and an output, the first input of the NAND gate connected to the key board and the second input of the NAND gate connected to the mode change-over switch mechanism, the first input to the NOR gate connected to the output of the NAND gate and the second input to the NOR gate connected to the clock pulse generator circuit.

5. The miniature type electronic device as claimed in claim 1 wherein a multi-vibrator is connected in series between the input of the wave form shaping circuit and the output of the mode change-over switch mechanism.

6. In a miniature type electronic device having a calculation ability; a mode change-over switch mechanism changing over a calculation enable mode to a calculation disable mode and vice versa; a calculation circuit connected to said mode change-over switch mechanism and including a plurality of volatile memory devices; an input circuit connected to said calculation circuit and having an input; a key board having an output connected to said input circuit input; a display driving circuit having an input connected to said calculation circuit memory devices; a display device connected to said display driving circuit; and a clock pulse generator circuit connected to at least said calculation circuit, the improvement comprising:

(a) means for continuously applying a power source to at least one of said volatile memory devices when said mode change-over switch mechanism is in the calculation disable mode;

(b) means for inhibiting the input circuit input from said key board output when said mode change-over switch mechanism is in the calculation disable mode;

(c) means for inhibiting said display driving circuit input from said memory device when said mode change-over switch mechanism is in the calculation disable mode whereby the content of said memory device is not lost when said mode change-over switch mechanism is in the calculation disable mode;

(d) said mode change-over switch mechanism having an input and an output;

(e) said calculation circuit having a first input connected to the output of the mode change-over switch mechanism, second and third inputs and an output;

(f) said input circuit has a first input, a second input connected to the output of the mode change-over switch mechanism, a third input and an output connected to the second input of the calculation circuit;

(g) the output of the key board is connected to the first input of said input circuit;

(h) said display driving circuit has a first input connected to the output of said calculation circuit, a second input connected to the output of the mode change-over switch mechanism and an output connected to said display device; and (i) said clock pulse generator circuit is comprised of a wave form shaping circuit having an input connected to the output of the mode change-over switch mechanism, a first output connected to the input of the mode change-over switch mechanism, a second output connected to the third input of the calculation circuit, and a third output connected to the third input of said input circuit.

7. The miniature type electronic device as claimed in claim 6 wherein said mode change-over switch mechanism includes an inverter having an output and a NOR gate having first and second inputs, the output of the inverter connected to the first input of the NOR gate and the second input of the NOR gate connected to the clock pulse generator circuit.

8. The miniature type electronic device as claimed in claim 6 wherein said input circuit includes a NAND gate having first and second inputs and an output and a NOR gate having first and second inputs and an output, the first input of the NAND gate connected to the key board and the second input of the NAND gate connected to the mode change-over switch mechanism, the first input to the NOR gate connected to the output of the NAND gate and the second input to the NOR gate connected to the clock pulse generator circuit.

9. The miniature type electronic device as claimed in claim 6 wherein a multi-vibrator is connected in series between the input of the wave form shaping circuit and the output of the mode change-over switch mechanism.

* * * * *